(12) United States Patent
Maleki et al.

(10) Patent No.: US 11,540,230 B2
(45) Date of Patent: Dec. 27, 2022

(54) PARAMETRIC AND NON-PARAMETRIC PEAK-TO-AVERAGE POWER RATIO (PAPR) REDUCTION TECHNIQUES

(71) Applicant: Samsung Electronics Co., Ltd., Suwon-si (KR)

(72) Inventors: Hamed Maleki, San Diego, CA (US); Gennady Feygin, San Diego, CA (US); Pranav Dayal, San Diego, CA (US); Kee-Bong Song, San Diego, CA (US)

(73) Assignee: SAMSUNG ELECTRONICS CO., LTD.

( * ) Notice: Subject to any disclaimer, the term of this patent is extended or adjusted under 35 U.S.C. 154(b) by 63 days.

(21) Appl. No.: 16/936,418

(22) Filed: Jul. 22, 2020

(65) Prior Publication Data

US 2021/0360537 A1  Nov. 18, 2021

Related U.S. Application Data

(60) Provisional application No. 63/026,719, filed on May 18, 2020.

(51) Int. Cl.
| | | |
|---|---|---|
| *H04W 52/20* | (2009.01) | |
| *H04L 27/26* | (2006.01) | |
| *H04L 5/00* | (2006.01) | |
| *H04W 52/12* | (2009.01) | |
| *H04L 1/00* | (2006.01) | |
| *H04W 72/04* | (2009.01) | |

(52) U.S. Cl.
CPC ........... *H04W 52/20* (2013.01); *H04L 1/0003* (2013.01); *H04L 1/0009* (2013.01); *H04L 5/0007* (2013.01); *H04L 27/2615* (2013.01); *H04W 52/12* (2013.01); *H04W 72/0473* (2013.01)

(58) Field of Classification Search
CPC ..... H04L 1/003; H04L 1/0009; H04L 5/0007; H04L 27/2615; H04W 52/00; H04W 52/12; H04W 52/22; H04W 52/16; H04W 72/0473; H04W 52/20; H04W 52/226; H04W 52/228
USPC .................................................. 370/329–330
See application file for complete search history.

(56) References Cited

U.S. PATENT DOCUMENTS

| | | |
|---|---|---|
| 2005/0190858 A1 | 9/2005 | Kim et al. |
| 2010/0135421 A1 | 6/2010 | Jung et al. |
| 2010/0273520 A1* | 10/2010 | Pelletier ............. H04W 52/325 455/522 |
| 2010/0308909 A1* | 12/2010 | Verma .................. H03G 3/3042 330/131 |

(Continued)

*Primary Examiner* — Candal Elpenord
(74) *Attorney, Agent, or Firm* — Renaissance IP Law Group LLP

(57) ABSTRACT

According to one general aspect, an apparatus may include a pre-transmission circuit configured to encode a data signal for communication. The apparatus may include a peak-to-average-power ratio (PAPR) controlling circuit configured to set a power level for a level-adjusted data signal. In some embodiments, the PAPR circuit may be configured to set the power level by employing a multi-loop, multi-phase technique, wherein an inner loop employs multiple phases to constrain the PAPR and reduce at least one power-related error condition, and wherein an outer loop updates the power level. The apparatus may include a transmitter circuit configured to transmit the level-adjusted data signal.

18 Claims, 4 Drawing Sheets

(56) References Cited

U.S. PATENT DOCUMENTS

| | | |
|---|---|---|
| 2011/0038271 A1* | 2/2011 | Shin .................. H04W 52/10 |
| | | 370/252 |
| 2011/0258244 A1 | 10/2011 | Kang |
| 2012/0250749 A1* | 10/2012 | Tadano ............. H04L 27/2614 |
| | | 375/224 |
| 2013/0003627 A1 | 1/2013 | Kravtsov |
| 2014/0269987 A1 | 9/2014 | Gubeskys et al. |
| 2014/0341315 A1* | 11/2014 | Cova ................ H04L 27/2626 |
| | | 375/296 |
| 2014/0341318 A1* | 11/2014 | Pourkhaatoun ... H04W 52/0258 |
| | | 375/297 |
| 2017/0005844 A1 | 1/2017 | Kang et al. |
| 2017/0288927 A1* | 10/2017 | Engin .................. H04L 5/0064 |
| 2018/0241347 A1* | 8/2018 | Petrovic .................. H03F 1/32 |
| 2019/0372817 A1 | 12/2019 | Geng et al. |
| 2021/0067386 A1* | 3/2021 | Cova ...................... H04B 1/04 |

* cited by examiner

PARAMETRIC AND NON-PARAMETRIC PEAK-TO-AVERAGE POWER RATIO (PAPR) REDUCTION TECHNIQUES

CROSS-REFERENCE TO RELATED APPLICATION

This application claims priority under 35 U.S.C. § 119 to Provisional Patent Application Ser. No. 63/026,719, entitled "PARAMETRIC AND NON-PARAMETRIC PEAK-TO-AVERAGE POWER RATIO (PAPR) REDUCTION TECHNIQUES" filed on May 18, 2020. The subject matter of this earlier filed application is hereby incorporated by reference.

TECHNICAL FIELD

This description relates to wireless communication, and more specifically to parametric and non-parametric peak-to-average power ratio (PAPR) reduction techniques.

BACKGROUND

The peak-to-average power ratio (PAPR) is the peak amplitude squared divided by the root mean squared (RMS) value squared. The PAPR is the relationship between the maximum power of a sample in a given transmitted symbol divided by the average power of that OFDM symbol. In simple terms, PAPR is the ratio of peak power to the average power of a signal. It is expressed in the units of decibels (dBs).

Large instantaneous PAPR generally occurs when, in a multicarrier system, the different sub-carriers are out of phase with each other. At each instant they are often different with respect to each other in phase values. When all the subcarriers achieve or approximately align in phase, the output envelope may suddenly shoot up which causes a 'peak' in the output envelope. Due to presence of large number of independently modulated subcarriers in a modern wireless system, the peak value of the system may be very high as compared to the average of the whole system.

Peak-to-Average Power Ratio (PAPR) reduction may be commonly employed on the transmitter side of the cellular communication system. The PAPR reduction is a non-linear operation resulting in additional signal impairment which manifests itself as loss of performance metrics including error vector magnitude (EVM), adjacent channel leakage power measurement or ratio (ACLR), In-Band Emission (IBE), or Spectrum Emission Mask (SEM) margin.

The error vector magnitude or EVM (sometimes also called relative constellation error or RCE) is a measure used to quantify the performance of a digital radio transmitter or receiver. A signal sent by an ideal transmitter or received by a receiver may have all constellation points precisely at their ideal locations, however various imperfections in the implementation (such as carrier leakage, low image rejection ratio, phase noise etc.) may cause the actual constellation points to deviate from the ideal locations. EVM is a measure of how far the points are from the ideal locations. Noise, distortion, spurious signals, and phase noise may degrade EVM, and therefore EVM provides a comprehensive measure of the quality of the radio receiver or transmitter for use in digital communications.

Adjacent channel power ratio (ACPR) or adjacent channel leakage power measurement or ratio (ACLR) is ratio between the total power of adjacent channel (assigned to another user) to the main channel's power (useful signal). Often ACPR is desired to be as low as possible. A high ACPR may indicate that significant spectral spreading has occurred.

In telecommunications, orthogonal frequency-division multiplexing (OFDM) is a type of digital transmission and a method of encoding digital data on multiple carrier frequencies. OFDM has developed into a popular scheme for wideband digital communication, used in applications, such as digital television and audio broadcasting, DSL internet access, wireless networks, power line networks, and 4G/5G mobile communications. In OFDM, multiple closely spaced orthogonal subcarrier signals with overlapping spectra are transmitted to carry data in parallel. Demodulation is based on Fast Fourier Transform algorithms. Each subcarrier (signal) is modulated with a conventional modulation scheme (such as quadrature amplitude modulation or phase shift keying) at a low symbol rate.

SUMMARY

According to one general aspect, an apparatus may include a pre-transmission circuit configured to encode a data signal for communication. The apparatus may include a peak-to-average-power ratio (PAPR) controlling circuit configured to set a power level for a level-adjusted data signal. In some embodiments, the PAPR circuit may be configured to set the power level by employing a multi-loop, multi-phase technique, wherein an inner loop employs multiple phases to constrain the PAPR and reduce at least one power-related error condition, and wherein an outer loop updates the power level. The apparatus may include a transmitter circuit configured to transmit the level-adjusted data signal.

According to another general aspect, a method may include setting a power level for a data signal based upon a peak-to-average-power ratio (PAPR) by employing a multi-loop, multi-phase technique. In some embodiments, the inner loop may employ multiple phases to constrain the PAPR and reduce at least one power-related error condition, and the outer loop updates the power level. The method may include transmitting the data signal according to the adjusted power level.

The details of one or more implementations are set forth in the accompanying drawings and the description below. Other features will be apparent from the description and drawings, and from the claims.

A system and/or method for wireless communication, and more specifically to parametric and non-parametric peak-to-average power ratio (PAPR) reduction techniques, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
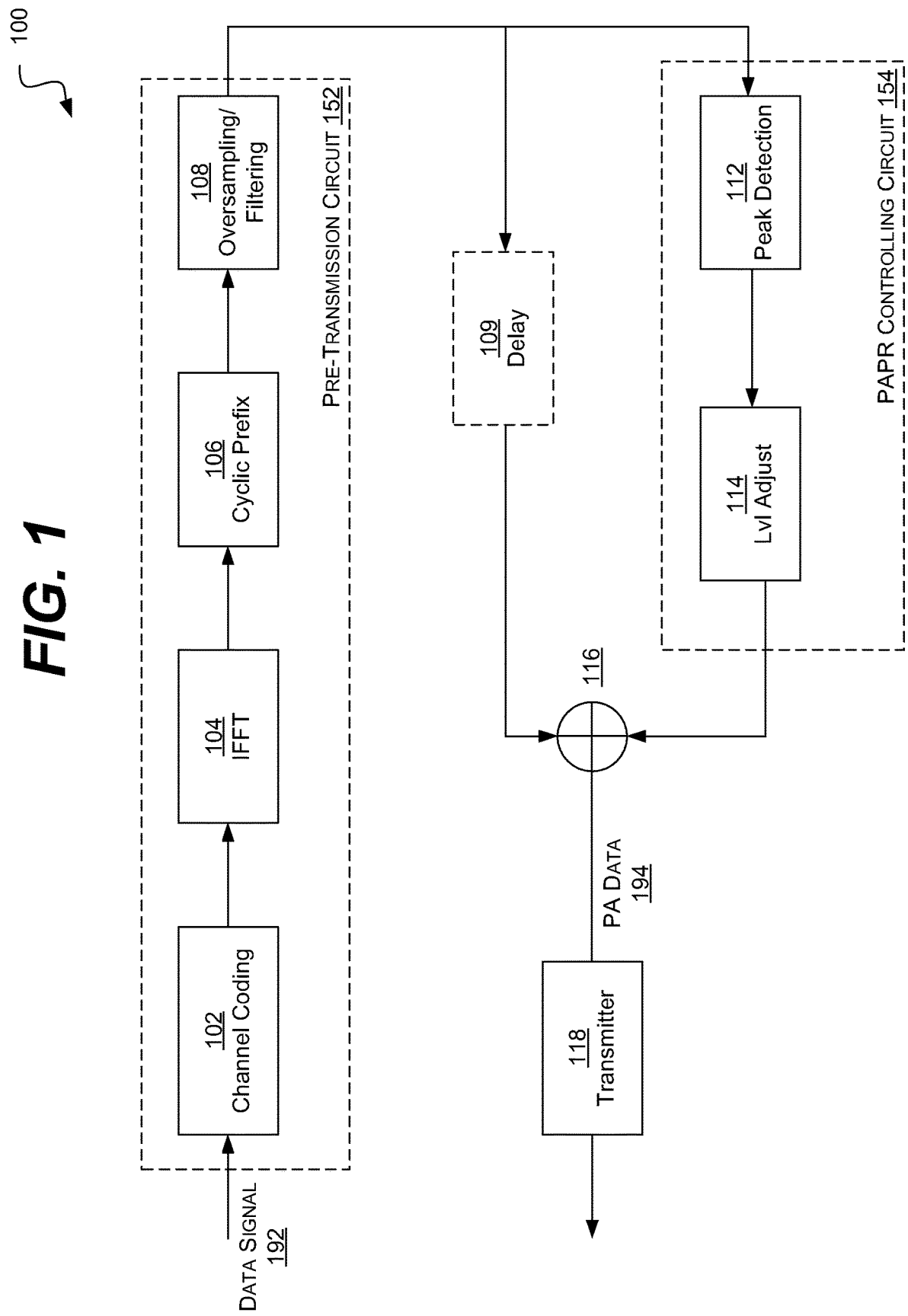
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may be part of and communicate via a communications network. Examples of a Wi-Fi protocol may include, but are not limited to: Institute of Electrical and Electronics Engineers (IEEE) 802.11g, IEEE 802.11n, IEEE 801.11ac, IEEE 802.11ax, etc. Examples of a cellular protocol may include, but are not limited to: IEEE 802.16m (a.k.a. Wireless-MAN (Metropolitan Area Network) Advanced), Long Term Evolution (LTE) Advanced, Enhanced Data rates for GSM (Global System for Mobile Communications) Evolution (EDGE), Evolved High-Speed Packet Access (HSPA+), fifth generation (5G), etc. It is understood that the above are merely a few illustrative examples to which the disclosed subject matter is not limited.

In one embodiment, the system may take a data signal 192 (e.g., an audio signal, etc.) and format or encode it for transmission across a wireless medium. In various embodiments, a receiver (not shown) may perform a reverse operation. In some embodiments, orthogonal frequency-division multiplexing (OFDM) may be employed. Although, it is understood that the above is merely one illustrative example to which the disclosed subject matter is not limited.

In the illustrated embodiment, the system 100 may include a pre-transmission or modulator circuit 152 configured to encode the data signal 192 for transmission. In the illustrated embodiment, the system 100 may also include a peak-to-average-power reduction (PAPR) circuit 154 configured to set a power level for a level-adjusted data signal 194. In such an embodiment, the encoded or modulated data signal may be combined with the output of the PAPR circuit 154 before transmission. In the illustrated embodiment, the system 100 may include a transmitter circuit 118 to send the level-adjusted data signal 194 across the communications medium.

In various embodiments, the pre-transmission or modulator circuit 152 may include a channel coding circuit 102 configured to map symbols of the data signal 192 to the constellation used by the encoding technique (e.g., OFDM), and, in some embodiments, to add error correction data to the data signal 192. In various embodiments, the pre-transmission or modulator circuit 152 may include a domain conversion circuit 104 configured to convert the data signal 192 from one domain to another (e.g., from the frequency domain to the time domain). In the illustrated embodiment, an inverse fast Fourier transform (IFFT) is shown. In the illustrated embodiment, the pre-transmission or modulator circuit 152 may include a cyclic prefix circuit 106 configured to add a cyclic prefix to the symbols of the data signal 192. In various embodiments, the pre-transmission or modulator circuit 152 may include an oversampling or filtering circuit 108 configured to sample the data signal 192 at the Nyquist rate or greater. In addition, additional filtering may be performed by the oversampling or filtering circuit 108. The pre-transmission or modulator circuit 152 may produce an encoded data signal.

In various embodiments, the PAPR circuit 154, described in more detail below, may be configured to perform parametric and non-parametric PAPR reduction where error vector magnitude (EVM)/adjacent channel leakage power measurement or ratio (ACLR), trade-offs may be improved while attempting to achieve a PAPR value very close to a target PAPR clipping level. In one such embodiment, if the parametric PAPR reduction technique is to be employed, the PAPR circuit 154 may restrict output of the technique to be a specific function of input and optimize some parameters of that function. In one such embodiment, if a non-parametric PAPR reduction technique may be employed, the technique may modify the received samples to improve the EVM-ACLR trade off.

In one embodiment, the PAPR circuit 154 may be configured to set a power level for a level-adjusted data signal 194. In one embodiment, the PAPR circuit 154 may be configured to set the power level by employing a multi-loop, multi-phase technique. In various embodiments, the technique may include an inner loop that employs multiple phases to constrain the PAPR and reduce at least one power-related error condition (e.g., EVM, ACLR, etc.), and wherein an outer loop updates the power level.

In one embodiment, the PAPR circuit 154 may include a Peak Detection circuit 112. In some embodiments, the Peak Detection circuit 112 may be configured to employ multiple phases to constrain the PAPR and reduce at least one power-related error condition (e.g., EVM, ACLR, etc.). In one embodiment, the PAPR circuit 154 may include a power adjustment circuit 114. The power adjustment circuit 114 may be configured to update the power level. In some embodiments, this may be done via a parametric technique.

In another embodiment, this may be done via a non-parametric technique. In some embodiments, the system 100 may be configured to employ either form of technique (either switching dynamically or statically), or in another embodiment, may only be configured to perform one type of the technique. In some embodiments, the form of technique may be selected based upon the type or nature of the data signal 192.

In the illustrated embodiment, the system 100 may include a delay circuit 109 to synchronize the encoded data signal with the output of the PAPR circuit 154. The encoded data signal and the output of the PAPR circuit 154 may be combined (via combination circuit 116), effectively adjusting the power level of the data signal 192 and forming the level-adjusted data signal 194.

In the illustrated embodiment, the system 100 may include a transmitter 118 to broadcast or transmit the power adjusted data signal 192 via the communications medium (e.g., wirelessly). As described above, in various embodiments, the system 100 may include a receiver circuit (not shown) to perform the inverse of the functions described herein and having the inverse structural elements to receive a wireless signal and convert it into a usable received data signal.

Figure 2:
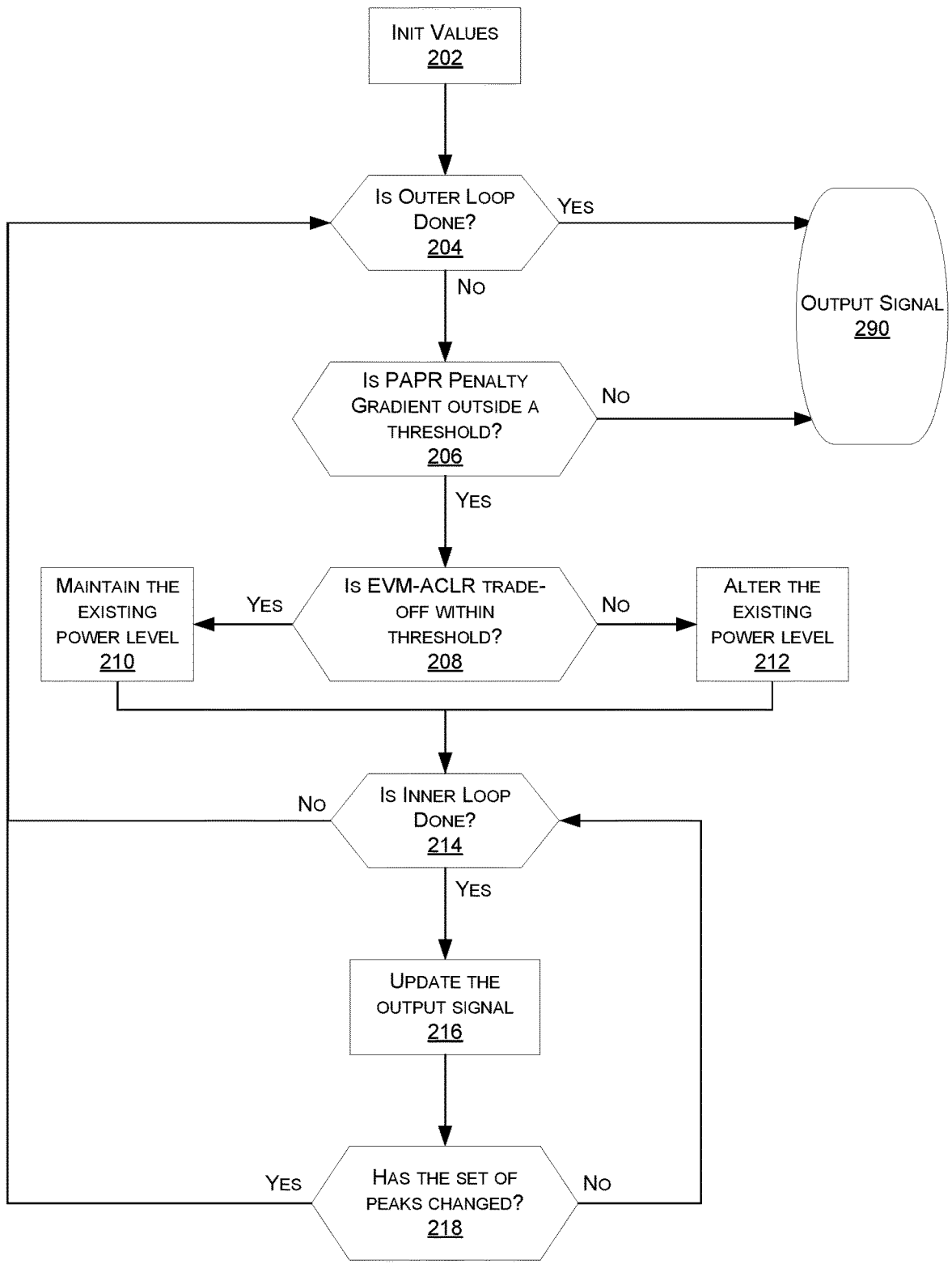
FIG. 2 is a flowchart of an example embodiment of a technique in accordance with the disclosed subject matter.

FIG. 2 is a flowchart of an example embodiment of a technique 200 in accordance with the disclosed subject matter. In the illustrated embodiment, a non-parametric technique for substantially simultaneously constraining the PAPR value and improving the trade-off between at least two signal values (e.g., ACLR and EVM). It is understood that the above is merely one illustrative example to which the disclosed subject matter is not limited.

In various embodiments, the technique 200 may be used or produced by the systems such as those of FIG. 1. Furthermore, portions of technique 200 may be used or produced by the systems such as that of FIG. 1. Although, it is understood that the above are merely a few illustrative examples to which the disclosed subject matter is not limited. It is understood that the disclosed subject matter is not limited to the ordering of or number of actions illustrated by technique 200.

In general, in one embodiment, the EVM versus ACLR trade off may be formulated as minimizing a linear combination of EVM and ACLR, while having a constraint on the PAPR. Further, in various embodiments, the frequency and time domain representations of the output data signal may be sufficiently oversampled (OSR). As such the general function that the PAPR Circuit attempts to achieve is given as:

$$\min_{Y} W_1' \cdot EVM + W_2' \cdot ACLR, \text{ wherein: } PAPR = \frac{\max|y_i|^2}{E[|y_i|^2]} < m \quad \text{Equation 1}$$

wherein,

Y is the output signal in the frequency domain;

y is the output signal in the time domain, and $y_i$ is the $i^{th}$ sample of y;

m is the target PAPR clipping level; and $W_1'$ and $W_2'$ are the linear combination coefficients that determines where in the EVM-ACLR trade off curve the PAPR circuit is operating in.

In one embodiment in which the OFDM symbols are employed, the approximate expression for ACLR over one OFDM symbol may be:

$$\min_Y W_1(Y-X)^H V(Y-X) + W_2 \frac{Y^H CY}{Y^H DY}$$ Equation 2

$$\text{s.t.} \quad PAPR = \frac{\max|y_i|^2}{E[|y_i|^2]} \cong \frac{\max|y_i|^2}{\frac{1}{N}\sum_{i=1}^{N}|y_i|^2} \le m$$

wherein,

X is the frequency domain representation of the input in the high OSR domain; and C, D and V are diagonal matrices, where the diagonal elements of D are 1 in the desired channel indices, the diagonal elements of C are 1 in the adjacent channel indices, and the diagonal element of V are 1 in the allocated data indices, and all other elements are 0, such that $$W_1 = \frac{W_1'}{\text{rank}(E)}, W_2 = W_2'.$$

In addition, in one embodiment, the cost function may be:

$$L(Y, \mu_1, \ldots, \mu_N) = W_1(Y-X)^H V(Y-X) + W_2 \frac{Y^H CY}{Y^H DY} +$$ Equation 3

$$\sum_{i=1}^{N} \mu_i \left( \frac{|y_i|^2}{\frac{1}{N}\sum_{i=1}^{N}|y_i|^2} - m \right) = W_1(Fy-X)^H V(Y-X) +$$

$$W_2 \frac{(Fy)^H CY}{(Fy)^H DY} + \sum_{i=1}^{N} \mu_i \left( \frac{|y_i|^2}{\frac{1}{N}\sum_{i=1}^{N}|y_i|^2} - m \right)$$

wherein, F is a high OSR Fast Fourier Transform (FFT) matrix.

Now that all basic terms and functions are defined, the actual technique employed by one embodiment of the PAPR circuit may be discussed.

In the illustrated embodiment, there may include two loops, an outer loop and an inner loop. In such an embodiment, the inner loop may attempt to determine when a new peak (in the peak-to-average power) appears in the signal, or when one of the older or previously encountered peaks disappears or is removed from the sample set by previous iteration. In such an embodiment, this may be thought of a looking for the "bottom of the bowl" or "crest of the mountain" (depending if the metaphor is related to minimums or maximums, in either case the peak or extreme value). Whereas, in one embodiment, the outer loop may modify the power level, and the loops may be run again, until some exit condition occurs.

In one embodiment, the inner loop may employ a technique similar to dual gradient descent. In such an embodiment, the technique may include two phases. The first phase may include determining that the PAPR constraint is satisfied. The second phase may include attempting to minimize the EVM-ACLR trade off (e.g., $W_1'EVM+W_2'ACLR$).

Block 202 illustrates that, in one embodiment, the initial values may be set. In various embodiments, this may be done via a configuration file, individual variables, or as hardcoded values. In various embodiments, the initial values may include the loop index values (e.g., k or j), the rate of change of the power ($\mu$), and any matrixes, etc., as described above.

Block 204 illustrates that, in one embodiment, a check may be done to determine if the outer loop has completed the maximum number of times. In various embodiments, a threshold value may be set to assure the loop is not infinite. In another embodiment, other terminating mechanisms or none at all may be employed. If the outer loop has been fully exhausted, the technique 200 may exit and the output signal may be sent at the current power level (as indicated by Block 290).

Block 206 illustrates that, in one embodiment, a check may be done to determine if the power level or more specifically the PAPR penalty gradient is outside (e.g., more than) a certain threshold value. In various embodiments, if the PAPR is within the allowed amount the technique 200 may exit and the output signal may be sent at the current power level (as indicated by Block 290).

In various embodiments, the determination of Block 206 may be represented by the first phase equation:

$$\frac{|y_i|^2}{\frac{1}{N}\sum_{i=1}^{N}|y_i|^2} \le m$$ Equation 4 where, again, m is the output signal in the target PAPR clipping level.

Block 208 illustrates that, in one embodiment, a check may be done to determine if the EVM-ACLR (or other signal characteristics) trade-off is within (e.g., less than) a given threshold value. In various embodiments, the determination of Block 206 may be represented by the second phase equation:

$$\frac{1}{N}\sum_{i=1}^{N}\left|\frac{\partial L(Y^t, \mu_1, \ldots, \mu_N)}{\partial y_i^{t*}}\right| \ge \epsilon \text{ or } t=1$$ Equation 5 where:

$\in$ is the threshold value, and t=1 is the initial run of the inner loop after being initialized in Block 202.

Block 210 illustrates that, in one embodiment, if the EVM-ACLR (or other signal characteristic) trade-off is within a given threshold value (e.g., m) the power level of the i-th sample may be maintained or the rate of change of the power level for the i-th sample may set to zero.

$$\mu_i^{j+1} = 0$$ Equation 6 where $\mu_i^{j+1}$ is the rate of change in the power level.

Block 212 illustrates that, in one embodiment, if the EVM-ACLR (or other signal characteristic) trade-off is outside a given threshold value (e.g., m) rate of change of the power level of the i-th sample may be altered or modified. In various embodiments, this may be done based upon the rate of change of the cost function, as described above.

$$\mu_i^{j+1} = \mu_i^j + \alpha \frac{\partial L(Y^t, \mu_1, \ldots, \mu_N)}{\partial \mu_i}$$ Equation 7 where α is a parameter that determines the rate of change in μ. The parameter α may be a constant parameter, or may be a function of $$\frac{\partial L(Y^t, \mu_1, \ldots, \mu_N)}{\partial \mu_i},$$

vary based on value of iteration index (j) or otherwise dynamically varying.

In various embodiments, the rate of change (μ) may be changed according to an equation that satisfies the complementary slackness condition. That is to say if a dual variable is greater than zero (slack) then the corresponding primal constraint may be an equality (tight). The complementary slackness condition also indicates that if the primal constraint is slack then the corresponding dual variable is tight (or zero). In such an embodiment, the technique may attempt to put more weight on the samples that exceed the PAPR target level.

Block 214 illustrates that, in one embodiment, the inner loop may be executed unless a threshold value (e.g., k) has been exceeded. In various embodiments, a threshold value may be set to assure the loop is not infinite. In another embodiment, other terminating mechanisms or none at all may be employed. If the inner loop has been fully exhausted, the technique 200 may return to Block 204 and repeat the inner loop. In various embodiments, the indexes for the inner and outer loops may increment as part of the respective loops repeating. This is not shown in FIG. 2.

Block 216 illustrates that, in one embodiment, the output signal may be updated, as described above. In some embodiments, during each iteration the output may be updated using a gradient descent method. In various embodiments, this may be illustrated by the equation below:

$$y_i^t = y_i^{t-1} - \lambda \frac{\partial L(Y^{t-1}, \mu_1, \ldots, \mu_N)}{\partial y_i^t}, i = 1, \ldots, N \quad \text{Equation 8}$$

Block 218 illustrates that, in one embodiment, the outer loop may repeat every time a new first new peak appears or one of the old peaks disappears from the set of peaks in the sample set. It is understood that the above is merely one illustrative example to which the disclosed subject matter is not limited.

Figure 3:
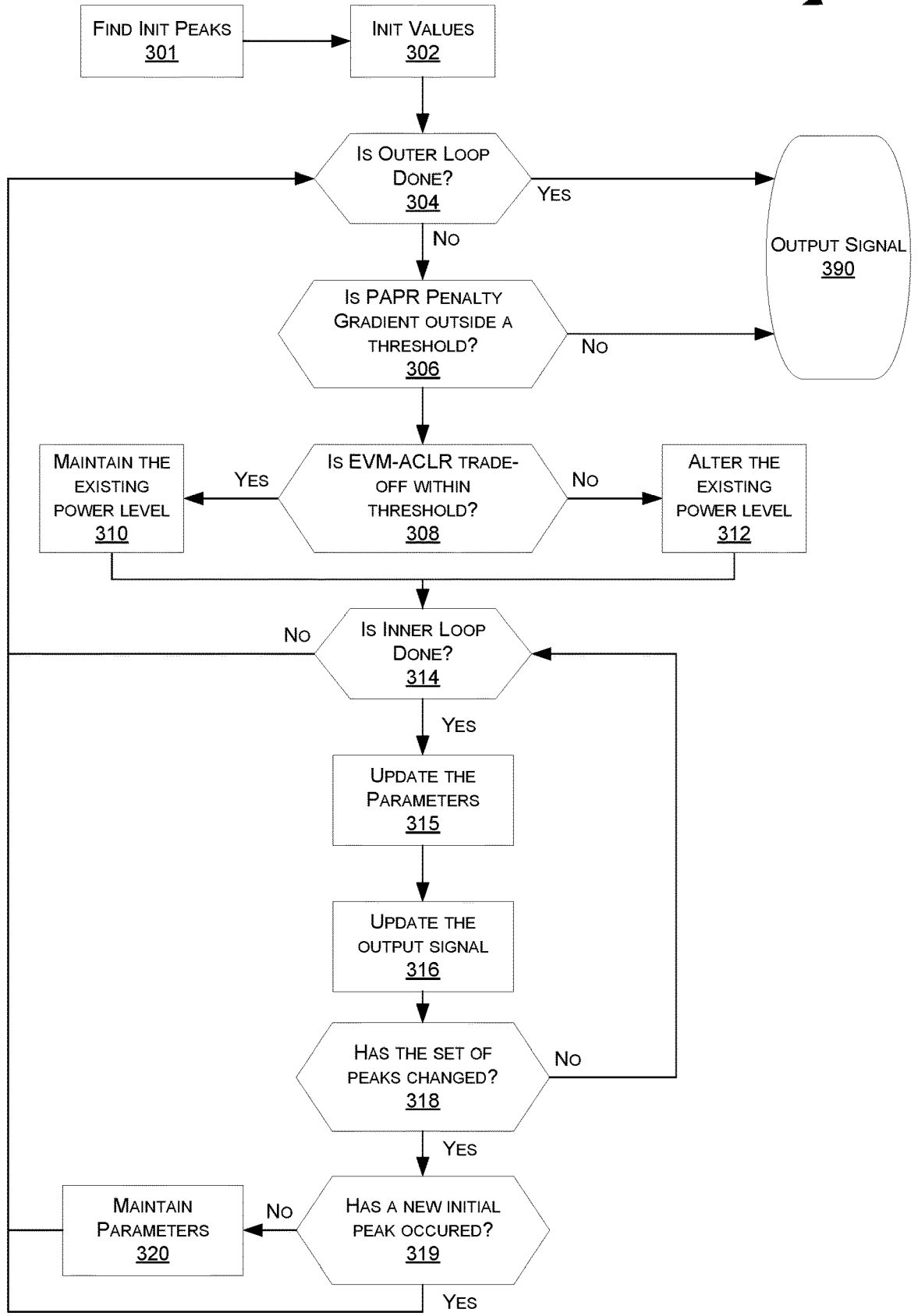
FIG. 3 is a flowchart of an example embodiment of a technique in accordance with the disclosed subject matter.

FIG. 3 is a flowchart of an example embodiment of a technique in accordance with the disclosed subject matter. In the illustrated embodiment, a parametric technique for substantially simultaneously constraining the PAPR value and improving the trade-off between at least two signal values (e.g., ACLR and EVM). It is understood that the above is merely one illustrative example to which the disclosed subject matter is not limited.

In various embodiments, the technique 300 may be used or produced by the systems such as those of FIG. 1. Furthermore, portions of technique 300 may be used or produced by the systems such as that of FIG. 1. Although, it is understood that the above are merely a few illustrative examples to which the disclosed subject matter is not limited. It is understood that the disclosed subject matter is not limited to the ordering of or number of actions illustrated by technique 300.

In general, in one embodiment, the EVM versus ACLR trade off may be formulated as minimizing a linear combination of EVM and ACLR, while having a constraint on the PAPR. Further, in various embodiments, the frequency and time domain representations of the output data signal may be sufficiently oversampled (OSR). As such the general functions described in reference to FIG. 2 and technique 200 may apply.

However, in this embodiment, some alternate equations are shown, and the technique 300 attempts to alter the power level by altering parameters of the sub-channel or encoding technique (e.g., OFDM). In one embodiment, these parameters may include, but are not limited to, the number and spacing of subcarriers, data rate, symbol duration, and cyclic prefix (CP) duration, etc. It is understood that the above are merely a few illustrative examples to which the disclosed subject matter is not limited.

As described above, in the illustrated embodiment, there may include two loops, an outer loop and an inner loop. In such an embodiment, the inner loop may attempt to determine when a new peak (in the peak-to-average power) appears in the signal, or when one of the older or previously encountered peaks disappears or is removed from the sample set. In such an embodiment, this may be thought of as a looking for the "bottom of the bowl" or "crest of the mountain" (depending if the metaphor is related to minimums or maximums, in either case the peak or extreme value). Whereas, in one embodiment, the outer loop may modify the power level via the parameters of the modulation technique.

In one embodiment, the inner loop may employ a technique similar to dual gradient descent. In such an embodiment, the technique may include two phases. The first phase may include determining that the PAPR constraint is satisfied. The second phase may include attempting to minimize the EVM-ACLR trade off (e.g., $W_1$'EVM+$W_2$ACLR).

Block 301 illustrates that, in one embodiment, a set of initial peaks may be found. In one embodiment, this may be done using the equation below.

$$|x_1| > A \quad \text{Equation 9}$$

where,

X is the frequency domain representation of input signal in high OSR domain, x is the time domain representation of input signal in high OSR domain, and A is a function of the target PAPR clipping level (m)

Specifically, A may be shown in the following equation:

$$A = m \sqrt{\frac{1}{N} \sum_{i=1}^{N} x_i^2} \quad \text{Equation 10}$$

Block 302 illustrates that, in one embodiment, the initial values may be set. In various embodiments, this may be done via a configuration file, individual variables, or as hardcoded values. In various embodiments, the initial values may include the loop index values (e.g., k or j), the rate of change of the power (μ), and any matrixes, etc., as described above.

Block 304 illustrates that, in one embodiment, a check may be done to determine if the outer loop has completed the maximum number of times. In various embodiments, a threshold value may be set to assure the loop is not infinite. In another embodiment, other terminating mechanisms or none at all may be employed. If the outer loop has been fully exhausted, the technique 300 may exit and the output signal may be sent at the current power level (as indicated by Block 390).

Block 306 illustrates that, in one embodiment, a check may be done to determine if the power level or more specifically the PAPR penalty gradient is outside (e.g., more than) a certain threshold value. In various embodiments, if the PAPR is within the allowed amount the technique 300 may exit and the output signal may be sent at the current power level (as indicated by Block 390).

In various embodiments, the determination of Block 306 may be represented by the first phase equation:

$$|y_i^t|^2 \leq A^2 \qquad \text{Equation 11}$$

Block 308 illustrates that, in one embodiment, a check may be done to determine if the EVM-ACLR (or other signal characteristics) trade-off is within (e.g., less than) a given threshold value. In various embodiments, the determination of Block 306 may be represented by the second phase equation:

$$\frac{1}{N}\sum_{i=1}^{N}\left|\frac{\partial L(Y^t, \mu_1, \ldots, \mu_N)}{\partial y_i^{t*}}\right| \geq \epsilon \text{ or } t = 1 \qquad \text{Equation 12}$$

where:
∈ is the threshold value, and
t=1 is the initial run of the inner loop after being initialized in Block 302.

Block 310 illustrates that, in one embodiment, if the EVM-ACLR (or other signal characteristic) trade-off is within a given threshold value (e.g., A) the power level of a i-th sample may be maintained or the rate of change of the power level of i-th sample may set to zero.

$$\mu_i^{j+1} = 0 \qquad \text{Equation 13}$$

where $\mu_i^{j+1}$ is the rate of change in the power level.

Block 312 illustrates that, in one embodiment, if the EVM-ACLR (or other signal characteristic) trade-off is outside a given threshold value the power level or rate of change of the power level of the i-th sample may be altered or modified. In various embodiments, this may be done based upon the rate of change of the cost function, as described above.

$$\mu_i^{j+1} = \mu_i^j + \alpha \frac{\partial L(Y^t, \mu_1, \ldots, \mu_N)}{\partial \mu_i} \qquad \text{Equation 14}$$

where α is a parameter that determines the rate of change in μ.

In various embodiments, the rate of change (μ) may be changed according to an equation that satisfies the complementary slackness condition. That is to say if a dual variable is greater than zero (slack) then the corresponding primal constraint may be an equality (tight). The complementary slackness condition also indicates that if the primal constraint is slack then the corresponding dual variable is tight (or zero). In such an embodiment, the technique may attempt to put more weight on the samples that exceed the PAPR target level.

Block 314 illustrates that, in one embodiment, the inner loop may be executed unless a threshold value (e.g., k) has been exceeded. In various embodiments, a threshold value may be set to assure the loop is not infinite. In another embodiment, other terminating mechanisms or none at all may be employed. If the inner loop has been fully exhausted, the technique 300 may return to Block 304 and repeat the inner loop. In various embodiments, the indexes for the inner and outer loops may increment as part of the respective loops repeating. This is not shown in FIG. 3.

Block 315 illustrates that, in one embodiment, the parameters affected by technique 300 may be updated. In one embodiment, these parameters may include, but are not limited to, the number and spacing of subcarriers, data rate, symbol duration, and cyclic prefix (CP) duration, etc. It is understood that the above are merely a few illustrative examples to which the disclosed subject matter is not limited.

In some embodiments, during each iteration the output may be updated using a gradient descent method. In one embodiment, the parameters may be updated according to the following equation:

$$h_i^t = h_i^{t-1} - \lambda \frac{\partial C(Y^{t-1}, \mu_1, \ldots, \mu_N)}{\partial h_i^{t-1}}, i = 0, \ldots, H \qquad \text{Equation 15}$$

where H is the number of parameters to be optimized, and $h_i$, i=1 . . . H are the set of parameters to be optimized.

Block 316 illustrates that, in one embodiment, the output signal may be updated according to the changed parameters. In such an embodiment, the effect the change in the parameters may have may be dictated by the pre-transmission circuit or modulation technique. As such, the exact equation for the output signal may not be fully defined in this document. In various embodiments, this may be illustrated by the equation below:

$$y_i^t = \text{specific function of } (h^t, x), i=1, \ldots, N \qquad \text{Equation 16}$$

Block 318 illustrates that, in one embodiment, the outer loop may repeat every time a new first new peak appears or one of the old peaks disappears from the set of peaks in the sample set. It is understood that the above is merely one illustrative example to which the disclosed subject matter is not limited.

Likewise, Blocks 319 and 320 illustrate that, in one embodiment, as the initial set of peaks is being created, the parameters may not be changed. In such an embodiment, this may allow a full set of peaks to be created before alterations occur. In such an embodiment, the equation for maintaining the parameters may simply be:

$$h_i^t = h_i^{t-1} \qquad \text{Equation 17}$$

It is understood that the above are merely a few illustrative examples to which the disclosed subject matter is not limited. In various embodiments, other parametric or non-parametric techniques and equations may be utilized.

Figure 4:
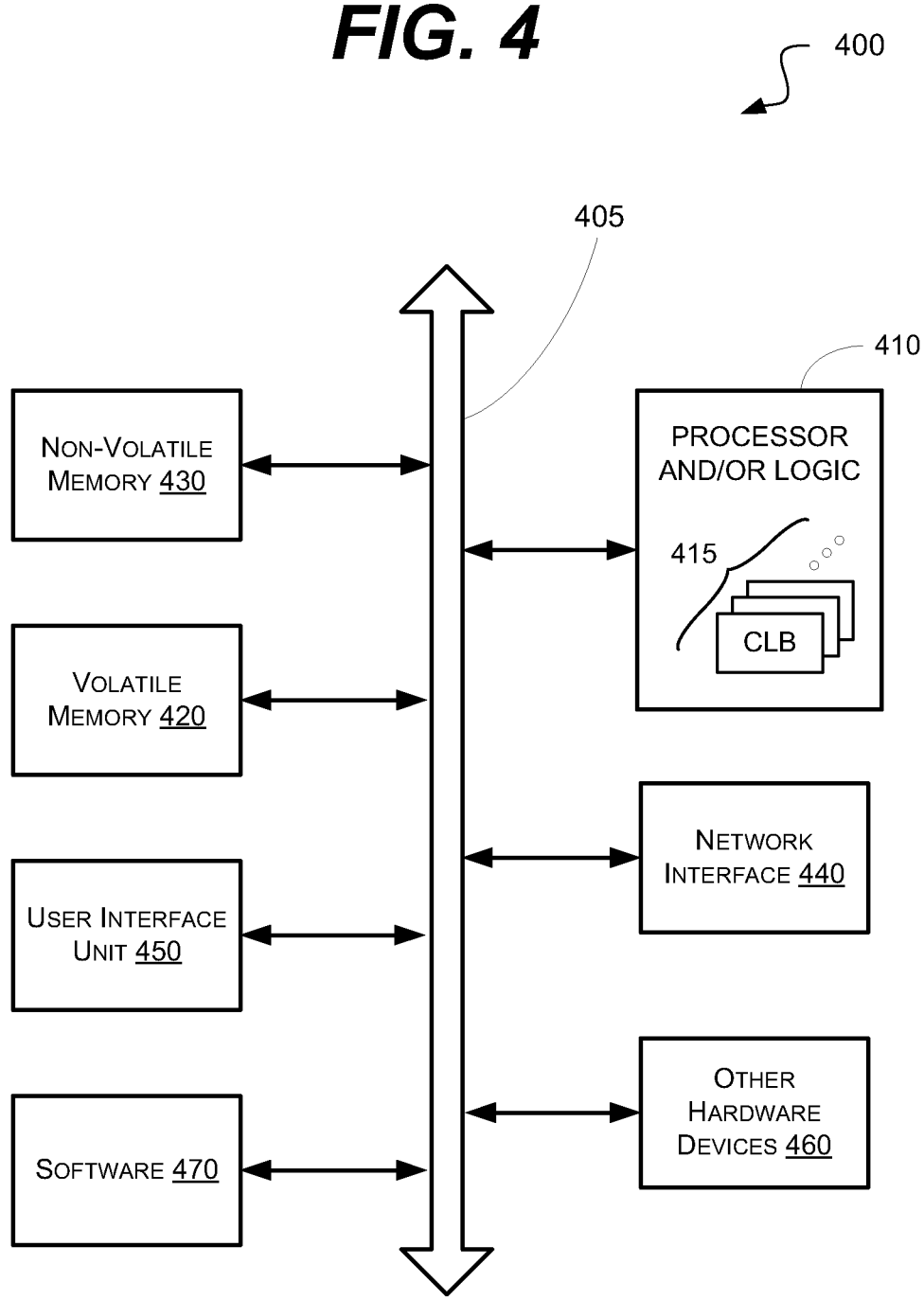
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus, comprising:
a pre-transmission circuit configured to encode a data signal for communication;
a peak-to-average-power ratio (PAPR) controlling circuit configured to set a power level for a level-adjusted data signal,
wherein the PAPR circuit is configured to set the power level by employing a multi-loop, multi-phase technique in which: an inner loop employs multiple phases to constrain the PAPR and reduce at least one power-related error condition, and an outer loop updates the power level; and
a transmitter circuit configured to transmit the level-adjusted data signal,
wherein the PAPR circuit is configured to, as part of a first phase of the inner loop:
compute a penalty function based, at least in part, upon a gradient with respect to data signal,
determine that the gradient is less than a threshold value, and
set the power level at an existing power level.

2. The apparatus of claim 1, wherein the PAPR circuit is configured to adjust the PAPR and the at least one power-related error condition substantially simultaneously.

3. The apparatus of claim 1, wherein the PAPR circuit is configured to:
determine a penalty gradient associated with the PAPR, and
adjust a rate of change in the power level, based upon the penalty gradient.

4. The apparatus of claim 1, wherein the multi-loop, multi-phase technique comprises a parametric technique that adjusts the power level by altering a waveform parameter of the level-adjusted data signal.

5. The apparatus of claim 4, wherein the PAPR circuit is configured to alter the waveform parameter based upon a rate of change in the data signal.

6. The apparatus of claim 1, wherein the outer loop iterates either a new peak of the data signal being encountered or a previously peak of the data signal vanishing as a consequence of signal adjustment.

7. The apparatus of claim 1, wherein the PAPR circuit is configured to:
determine that a power-related error condition is greater than a threshold value, and
adjust the power level based, at least in part, upon a gradient of change.

8. The apparatus of claim 1, wherein the PAPR circuit is configured to switch between a parametric technique and a non-parametric technique based, at least in part, upon a characteristic of the data signal.

9. The apparatus of claim 1, wherein the at least one power-related error condition comprises an error vector magnitude (EVM) condition, and an adjacent channel power leakage ratio (ACLR) condition.

10. A method, comprising:
setting a power level for a data signal based upon a peak-to-average-power ratio (PAPR) by employing a multi-loop, multi-phase technique in which:
an inner loop employs multiple phases to constrain the PAPR and reduce at least one power-related error condition, and
an outer loop updates the power level; and
transmitting the data signal according to the adjusted power level,
wherein the method further comprises, as part of a first phase of the inner loop:
computing a penalty function based, at least in part, upon a gradient of the data signal,
determining that the gradient is less than a threshold value, and
setting the power level at an existing power level.

11. The method of claim 10, wherein setting the power level includes adjusting the PAPR and the at least one power-related error condition substantially simultaneously.

12. The method of claim 10, wherein setting the power level comprises:
determining a penalty gradient associated with the PAPR, and
adjusting a rate of change in the power level, based upon the penalty gradient.

13. The method of claim 10, wherein the multi-loop, multi-phase technique comprises a parametric technique that adjusts the power level by altering a waveform parameter of the data signal.

14. The method of claim 13, wherein altering the waveform parameter comprises altering the waveform parameter based upon a rate of change in the data signal.

15. The method of claim 10, wherein the outer loop iterates based on either a new peak of the data signal being encountered or a previously peak of the data signal being no longer valid.

16. The method of claim 10, wherein setting the power level comprises:
determining that a power-related error condition is greater than a threshold value, and
adjusting the power level based, at least in part, upon a gradient of change.

17. The method of claim 10, wherein the method further comprises:
switching between a parametric technique and a non-parametric technique based, at least in part, upon a characteristic of the data signal.

18. The method of claim 10, wherein the at least one power-related error condition comprises an error vector magnitude (EVM) condition, and an adjacent channel power leakage ratio (ACLR) condition.

* * * * *